Nov. 3, 1953 R. LANDAU ET AL 2,658,087
CHLORINATION OF OLEFINS IN DILUTE MIXTURES
Filed June 3, 1948
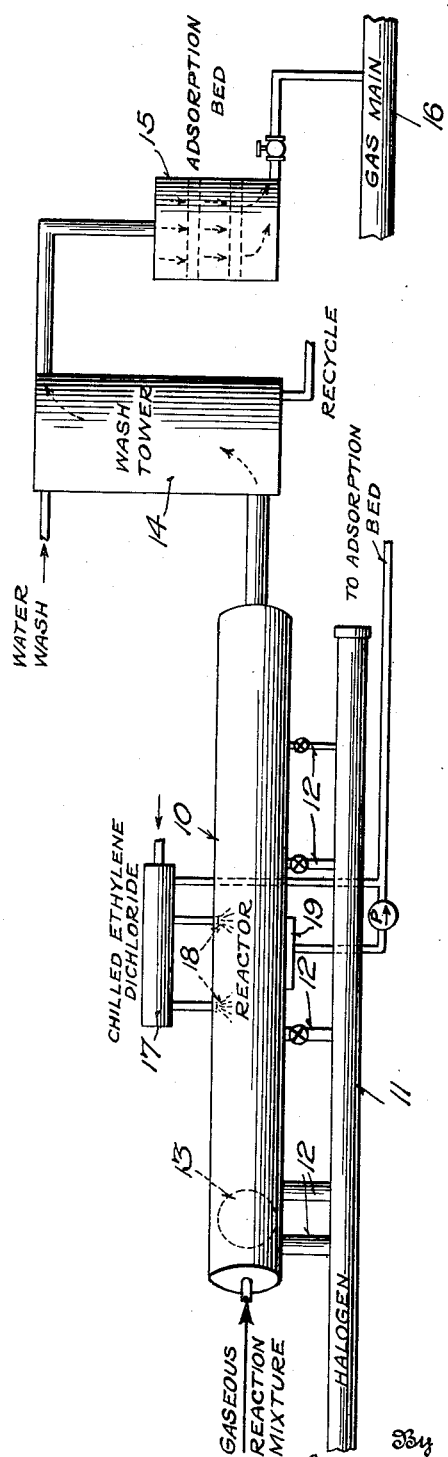
Inventors
RALPH LANDAU,
ROBERT B. EGBERT,
By
Lemmes, Kegin, Robinson & Lemmes.
ATTORNEYS Patented Nov. 3, 1953

2,658,087

UNITED STATES PATENT OFFICE 2,658,087

CHLORINATION OF OLEFINS IN DILUTE MIXTURES

Ralph Landau, Brooklyn, N. Y., and Robert B. Egbert, Atlantic Highlands, N. J., assignors, by mesne assignments, to Chempatents, Inc., New York, N. Y., a corporation of Delaware Application June 3, 1948, Serial No. 30,794

6 Claims. (Cl. 260—662)

The present invention relates to processes for the production of olefin dihalides and has particular reference to a novel process for the production of olefin dihalides from gaseous mixtures normally containing small quantities of olefins in the presence of substantial amounts of other gaseous hydrocarbons and hydrogen.

Olefinic dihalides such as ethylene dichloride are of considerable importance industrially, being employed for example as solvents, and as chemical intermediates in the manufacture of vinyl chloride. At the present time, these compounds are manufactured commercially by reaction of the desired halogen with the olefin in relatively purified, concentrated form. These processes may be operated at varying temperatures from below 0° centigrade to above 200° centigrade, with varying atmospheric pressures, with or without catalysts. Such processes may involve the use of anhydrous gases in carrying out the reaction, in the presence of a desiccant catalyst such as calcium chloride, in an effort to avoid the incurrence of undesired side reactions. Even with carefully controlled conditions of reaction, undesirable contamination of the products through the occurrence of substitution reactions yielding polyhalogens of little value compared with ethylene halides occurs, necessitating costly refinement of the end products to attain the purity required by commercial standards and causing formation of less valuable byproducts.

Olefins suitable for halogenation occur in small amounts in gaseous mixtures employed commercially for heating and lighting purposes, and occurring as waste or side products of established commercial processes. For example, typical available sources of ethylene comprise coke oven gas and producer gas, these gases having the following exemplary compositions:

| | Typical Straight Coke Oven Gas | Typical Producer Gas |
|---|---|---|
| Carbon Dioxide | 1.8 | 5.2 |
| Benzene | .9 | |
| Ethylene | 2.3 | 1.0 |
| Oxygen | .8 | .2 |
| Carbon Monoxide | 5.5 | 26.3 |
| Hydrogen | 49.2 | 14.4 |
| Methane | 30.3 | 1.8 |
| Nitrogen | 9.2 | 51.1 |
| | 100.0 | 100.0 |

Such gases normally contain relatively large amounts of moisture, rendering their use in known anhydrous gas reaction systems for the manufacture of olefinic halides, impractical and uneconomical.

The foregoing typical gases such as coke oven gas, are produced in enormous amounts for use as fuels, so that the total amount of ethylene burned yearly is quite large. Attempts to employ this available ethylene component in the production of olefin dihalides have not been successful commercially. These gases contain hydrogen, methane and carbon monoxide in rather large amounts, all of which are known to react with halogens such as chlorine, for example, dissipating the chlorine constituent available for reaction and forming undesirable contaminants of little commercial value. Thus, all efforts to use these commercial gases as sources of raw materials for the production of olefinic dihalides such as ethylene dichloride have involved liquefaction or other costly reaction and purification methods.

Another example of an inexpensive, readily available source of olefins is represented by ethylene emerging from certain chemical reactions in such dilute form that it no longer can be recycled with economy, or which must be exhausted from the reaction system to maintain a desired constituent ratio. For example, refinery waste gases such as tail gas from catalytic crackers, may contain up to 5% ethylene. Also, in commercial scale operations for the manufacture of ethylene oxide, ethylene in relatively pure form in the presence of an inert gas such as nitrogen, is passed over a catalyst with small amounts of oxygen from air to obtain ethylene oxide. The conversion ratio seldom exceeds fifty percent, and normally unreacted ethylene must be recycled. However, some purge gas must be withdrawn continuously from the system to maintain the reactant gases in proper ratio, and this purge or tail gas contains an appreciable amount of ethylene in dilute concentration, which normally passes to waste. Tail gas from such a direct oxidation process may have the following typical composition:

Tail gas

| | |
|---|---|
| Ethylene | 2.0 |
| Ethane | 0.5 |
| Carbon dioxide | 10.0 |
| Oxygen | 3.0 |
| Nitrogen | Balance |
| Water | Saturated |

An object of the present invention is to provide a new process for the preparation of olefin dihalides, by the reaction of gaseous olefins and halogens.

More specifically, it is an object of the present invention to provide a new process for the manufacture of ethylene dichloride by the reaction of gaseous ethylene with chlorine.

A further object is to provide a new process for the manufacture of olefin dihalides by the reaction of gaseous olefins found in relatively small constituent percentage in commercial gases such as coke oven gas and producer's gas, with a halogen.

A further object is to provide a new process for the manufacture of ethylene dichloride employing ethylene in admixture with relatively substantial amounts of other gaseous hydrocarbons, hydrogen, and other ingredients capable of halogenation, without incurring such substantial side or substitution reactions with the hydrogen and gaseous hydrocarbons other than ethylene as to render the process commercially inacceptable.

A further object is to provide an inexpensive source of olefin dihalides, the compounds being produced by the reaction of the component materials in the gaseous state without harmful effect upon gaseous mixtures carrying the olefin ingredient in accordance with the intended use of the said residual gaseous mixture.

A further object is the economical production of ethylene dichloride as a substantially pure product meeting the commercial standards of purity and free from contamination by the presence of undesired halogen-hydrocarbon or halogen-hydrogen reaction products.

A further object is to provide a new method for the manufacture of ethylene dichloride, including the step of recirculating liquid ethylene dichloride through the reaction zone to effect a partial separation of gaseous end product from the reaction mixture, at an intermediate stage of the reaction.

A further object is to provide a new process for the treatment of an ethylene component found in such dilute concentration in gaseous mixtures as to render the recovery thereof by conventional practices economically unsound, by reacting the ethylene component in the gaseous mixture with a halogen in the gaseous or liquid phase, under operating conditions producing a maximum of ethylene halide, minimizing the formation of undesired side products to a percentage well below that experienced with present commercial practices.

A further object is to provide a process for the manufacture of ethylene dichloride by the halogenation of the ethylene component normally found in such gaseous mixtures as fuel gas, the residual fuel gas being free from hydrogen chloride and chlorinated hydrocarbons such as would corrode the fuel gas system and otherwise impair use of the fuel gas for its intended purposes.

Yet a further object is to provide a process for the manufacture of ethylene dichloride from residual gases obtained from processes for the manufacture of ethylene oxide, recovering substantially all ethylene unreacted with oxygen and passed off the system as a component of tail gases as the dichloride, obtaining a very high percentage of conversion of ethylene to useful products.

Other objects and advantages of the present invention will be apparent from the following detailed description thereof taken in connection with the attached flow diagram illustrative of a preferred method of carrying out the invention.

The invention is predicated upon the discovery that under certain selected conditions of reaction, the rate of reaction for the addition of halogens to the olefinic double bond, is relatively much faster than the substitution of the hydrogen by the halogen, or the direct reaction of halogen with hydrogen and hydrocarbon compounds such as methane.

The process of the invention permits of reaction of olefins and a selected halogen under conditions which normally would be expected to lead to the production of undesired substitution by-products of little comparative commercial value to a prohibitive degree. This may be accomplished without incurring the expense incident to the incorporation of predrying and precompression procedures in the process, or the expense and procedural complexity of using a catalytic bed to effect the conversion.

The invention will now be described in detail in connection with one of its preferred applications to the production of ethylene dichloride, it being understood that the principles of the invention are equally applicable to the halogenation of olefins other than ethylene, or for example to produce the dibromides of the selected olefin.

The source of ethylene to be employed in carrying out the process comprises gaseous mixtures characterized by the presence of a small percentage of olefinic hydrocarbons such as ethylene, as a part of a main gaseous mixture comprised of other hydrocarbons, hydrogen, inert gases and similar non-reactants. As examples, the source may comprise commercial gases such as coke oven gas, refinery waste gas and producer gas, wherein ethylene occurs in such dilute quantities as to render recovery economically unfeasible. One preferred source of ethylene resides in the residual ethylene component found in purge or tail gases resulting from commercial ethylene oxidation processes. An important advantage of the invention resides in the fact that these typical commercial gases may be rendered available for their intended uses subsequent to chlorination of the ethylene component, without the introduction of costly cleansing or purification methods into the system.

The ethylene component found in very dilute concentration in gaseous mixtures of this type, is reacted with chlorine under conditions minimizing the reaction of the chlorine with other components present to provide unwanted substitution products. The conditions under which the reaction is carried out, render the presence of a moisture factor in the gaseous mixture of no material consequence. This is of considerable importance from the standpoint of process cost reduction, for such readily available sources of ethylene as coke oven gas, normally containing substantial amounts of moisture, may be employed without special treatment.

The process is operative in connection with gaseous mixtures containing ethylene in concentrations ranging from as low as 0.1% to as high as 20% by volume of the gaseous mixture. However, use of gaseous feed mixtures containing less than 0.5% of ethylene has proven uneconomical in actual practice, and for this reason concentrations of above 0.5% are desirable. The use of gaseous mixtures containing over 20% of ethylene raises a serious problem of temperature control, discussed in more detail hereinafter, which renders it more profitable to use gaseous mixtures containing such high concentrations for purposes other than direct chlorination of ethylene.

Accordingly, it is preferred to employ gaseous mixtures containing ethylene in concentration ranging between 0.5% and 8% by volume. Necessary control of the rate and degree of chlorination is facilitated, rendering unnecessary the use of special procedural controls, and inhibiting excessive temperature rises in the reaction zone which would require cooling apparatus. Also, this dilute concentration of ethylene has the effect of minimizing substitution reactions.

The chlorine constituent should be added to the gaseous reaction mixture in such amount as to avoid the presence of excess chlorine in the reaction zone. This is preferred for reasons of economy, and to reduce the explosion hazard attendant upon hydrogen and chlorine mixtures. Thus, it is preferred to add chlorine or other halogen to the gaseous reaction mixture in an amount sufficient to provide 0.7 to 0.98 mole of halogen for each mole of olefinic compound present. Excellent results are obtained by employing from 0.8 to 0.95 mole of chlorine to ethylene.

An important feature of the process of the invention resides in the discovery that unwanted substitution and side reactions in the gaseous reaction mixture, may be minimized by carefully avoiding the concentration of excesses of chlorine or other halogen at any point in the reaction stream. This may be accomplished by the introduction of chlorine into the reaction zone so that the chlorine is absorbed by addition reaction with the ethylene component present, at substantially the rate of introduction of the chlorine into the reaction zone. To this end, the chlorine may be introduced through a single inlet, exercising a careful control of the rate of chlorine injection in accordance with other reaction conditions present so as to accomplish complete reaction thereof with the ethylene.

This may be accomplished advantageously by introducing the chlorine into the reaction zone at a plurality of points, properly spaced to achieve a desired overall rate of chlorine injection.

It has further been found that the reaction is markedly improved by varying the proportions of chlorine added to the reaction stream at the above mentioned plurality of points of introduction. Depending on conditions, for example, it has been found that a substantial proportion of the total amount of halogen reactant to be added may be incorporated at the initial section of the reaction zone, accomplishing a major proportion of the chlorination reaction before the temperature of the reaction mixture rises beyond permissible limits. Addition of progressively smaller amounts of chlorine to the partially chlorinated reaction mixture, at subsequent points along the reaction zone, permits maintenance of such control of the temperature and rate of reaction as will permit of substantially complete chlorination of the ethylene component, minimizing the chlorination of the other hydrocarbon and hydrogen components present. The chlorine may be added in the gaseous phase. In certain applications of the invention, it is advantageous for technical as well as other reasons to add the chlorine constituent in the liquid phase, an example of this practice being described in detail hereinafter.

It is preferred to carry out the reaction in the absence of light, in order to minimize substitution or side reaction of the constituents.

The gaseous reaction mixture emerges from the reaction zone with minute or substantially no traces of unreacted chlorine present, eliminating the introduction of costly purification procedures into the process. This is especially important when coke oven gas or other sources of ethylene are to be employed subsequently for heating and illuminating purposes. The presence of chlorine in the residual gaseous mixture subsequent to completion of the olefin-halogen phase of the reaction, provides serious problems of equipment corrosion, and produces offensive, corrosive fumes when the gaseous mixture is burned.

The reaction temperatures employed are important from the standpoint of inhibiting side and substitution reactions of hydrocarbons and hydrogen with halogen in the reaction zone, as well as elimination of the explosion hazard. It is known that the addition of a halogen to an olefinic double bond, liberates considerable heat, for example 930 B. t. u. for each pound of ethylene dichloride formed. In accordance with the present invention, reaction temperatures are selected with the object in view that liberated heat will be absorbed and dissipated by the diluent gases present in the reaction stream along with the ethylene dichloride. This procedure is particularly advantageous, employing gaseous mixtures containing less than about 5% of ethylene by volume. In this instance, the great excess of relatively inert gases present keeps the reaction temperature at permissible and preferred levels, minimizing side reactions and rendering the use of artificial cooling means unnecessary.

The olefin-halogen reaction will occur at temperatures ranging from $-10°$ C. to $100°$ C. and above. However, with the above expressed factors of process economy and hazard elimination in mind, it is preferred to use initial reaction temperatures ranging between $10°$ C.–$80°$ C. Temperatures approaching $80°$ C. undesirably initiate comparatively substantial side reactions, rendering the use of special reaction and temperature control procedures and equipment, necessary.

The rate of reaction may vary within wide limits determined by factors of temperature control, chlorine concentration and rate of addition of chlorine to the reaction mixture. However, following the procedures expressed above, the time of contact of chlorine and ethylene in the reaction zone may be as short as one hundredth of a second to sixty seconds, producing excellent results in terms of completeness of reaction. The contact time is determined in accordance with the length of the reaction zones, and the rate of flow of the reaction components. For example, when the reaction zone is six feet long and the rate of flow one foot per second, the reactant contact time can be adjusted with practicality to six seconds. In special applications of the process, it may be desirable to appreciably extend the time of contact of the reactants, an example of such a special procedure being set forth hereinafter.

The process of the invention proceeds substantially to completion of the olefin-halogen reaction in the absence of conventional chlorinating catalysts. Several advantages stem from this, a major consideration being the elimination of this substantial cost factor and the substantial reduction in amount of substitution products formed such as polyhalogens and hydrochloric acid. While catalytic agents accelerate the rate of reaction of olefins and halogens, the resulting waste of chlorine in the formation of substitution byproducts and the resultant necessity for costly and tedious product purification, render the elimination of the use of catalysts desirable, providing a commercially acceptable rate of reaction can be maintained. This is accomplished by the present invention. It will be understood, however, that the usual chlorinating catalysts may be employed in carrying out the invention, if desired, but that an outstanding feature of the process of the invention resides in obtaining a maximum of uncontaminated end product in the absence of catalysts.

It has been discovered that the rate of reaction of the olefin-halogen mixture may be appreciably accelerated if the reaction is carried out in the presence of iron, preferably in the form of iron reaction vessels or containers such as a tubular member, defining the reaction zone. Iron turnings or other forms of iron may be placed in the iron reaction vessel, increasing the catalytic effect of the iron by offering a greater contact surface to the gaseous reactants. The explanation of this acceleration of the rate of reaction of chlorine and ethylene is not known, but the process is accomplished with little or no increase in the amount of substitution products formed.

The presence of small amounts of oxygen in the reaction zone, within the limits of 0.5% to 5.0%, materially assists in reducing the amount of substitution taking place. As coke oven gas normally contains less than 1% oxygen, it is very well suited for use in the process of the invention. The same may be said of tail gas from ethylene oxide converters, which usually contain several percent of oxygen.

Under some unfavorable reaction conditions, it may be found that the formation of substitution and side products other than ethylene halides, will go as high as 50% of the chlorinated product, forming, for example, 1,1,2 trichlorethane, which is valueless commercially, as compared with ethylene dichloride. Under the preferred reaction conditions of the invention, this ratio of unwanted substitution products is reduced sharply to as low as for example 10% and lower. It has been found that the undesired yield of trichlorethane may be further diminished by adding initially a small amount of trichlorethane to the reaction mixture, which acts in the nature of a depressant. The depressant is recovered in the subsequent refining treatment of the end product, for recycling through the system.

In some instances, it is preferred to remove a portion of the ethylene dichloride end product from the reaction zone at a point or points intermediate the length thereof. It has been found that when the reaction mixture becomes saturated with ethylene dichloride, at temperatures over 60° C. and approaching 100° C., conditions are more favorable for the incidence of undesirable substitution reactions, than when the reaction mixture is unsaturated. The intermediate withdrawal of ethylene dichloride may be effected with an activated carbon adsorption bed, or by solvent extraction. The preferred method of intermediate withdrawal embodies the introduction of liquid ethylene dichloride into the reaction zone, to effect condensation of a portion of the gaseous end product, thereby maintaining the concentration of product in the reaction mixture below the saturation point. The condensant ethylene dichloride preferably may be chilled, whereby the temperature in the reaction zone is reduced, thus further minimizing the incidence of undesirable side reactions and substitution reactions. The chilled material may be introduced into the reaction vessel in any convenient way. For example, chilled ethylene dichloride may be sprayed into the reaction mixture stream in the reaction vessel and condensed product and spray collected in a suitable sump for delivery to the processing stage to be described. A portion of the product thus obtained may be recycled in the condensing step, the remainder being passed along for further purification.

Also, advantageous results in terms of accelerated rate of reaction are achieved by using a vertically disposed reaction tube or tower, the reaction stream being introduced at the bottom of the tower. Ethylene dichloride recycled from the end product is introduced at a controlled temperature of from −10° C. to 80° C. This embodiment of the invention is found to increase the rate of reaction, and reduces the contact time necessary. This modified method further minimizes conditions leading to occurrence of undesired side and substitution reactions, particularly as to the formation of local zones of elevated temperatures in the reaction zone.

The step of recycling ethylene dichloride through the reaction zone may be advantageously employed in connection with the introduction of chlorine reactant into the reaction stream. The ethylene dichloride may be used as a vehicle for the introduction of chlorine into the system, the chlorine being dissolved in the ethylene dichloride, in the liquid phase.

Where intermediate condensation of product is effected by means of chilled ethylene dichloride, it is permissible and may be desirable to heat the initial reaction mixture, with or without a small proportion of chlorine added, in order to accelerate the rate of reaction upon introduction of the reaction mixture into the reaction zone. If this is done, the chilled liquid ethylene dichloride added, additionally serves to regulate the temperature of chlorination of the bulk of the reaction mixture in the reaction zone, avoiding the incidence of undesirable excessive temperatures therein.

Upon completion of the olefin-halogen reaction phase in the reaction zone, the gases may be cleansed to remove any trace of unreacted chlorine, hydrochloric acid and other acidic impurities which might affect the value of the residual gases for subsequent use, as for example, a fuel, after removal of the olefin dihalide constituent. This may be accomplished by treating the reaction mixture with a slurry of lime, using a packed or spray column of suitable design for this purpose. It has been found that the lime slurry also effectively lowers the temperatures of the reaction mixture, eliminating the necessity for employing special cooling equipment for this purpose.

The reaction mixture, thus purged of acidic impurities and cooled, preferably is passed over a bed of activated carbon of the stationary or moving bed type, for the selective extraction of ethylene dichloride therefrom. The residual gases may be passed to waste or as in the case where coke oven gas is employed as the source of ethylene, passed directly into the gas mains for consumption.

Upon saturation, the activated carbon may be treated for the recovery of adsorbed ethylene dichloride, as for example by steaming or other application of heat, with or without the application of vacuum. The ethylene dichloride product may be further purified by conventional distillation methods, if desired.

Ethylene dichloride may be absorbed direct from the reaction mixture by passing the gases through a solvent absorption system, containing as a solvent an organic compound of lower vapor pressure than ethylene dichloride. Preferably, a halogenated organic solvent is employed. However, other conventional hydrocarbon solvents may be employed satisfactorily. The ethylene dichloride product may be removed from the solvent by conventional distillation methods.

If desired, the lime slurry scrubbing step may be eliminated and the gaseous reaction mixture passed directly to a bed of activated carbon for selective adsorption of ethylene dichloride. In this instance, if it is intended to use the residual gases for heat and light purposes, it may prove to be desirable to scrub the residual gases with water to remove acidic residues, before introduction into the gas mains. This procedure is feasible in view of the small amounts of chlorinated substitution products formed in the reaction zone.

Referring to the attached flow diagram, there is shown a reaction chamber 10 receiving a flow of gaseous reaction mixture containing olefin from a suitable source, not indicated. Halogen reactant is introduced into the reaction chamber through a conduit 11 having one jet 12 or a plurality of outlets or jets 12, so spaced along the length of the reaction chamber and so proportioned as to introduce a major proportion of halogen into the gaseous reaction mixture at its point of introduction into the reaction chamber indicated generally at 13. Upon completion of the reaction, the gaseous reaction mixture may be passed through a scrubbing tower 14 and from thence to an adsorption bed 15 where the olefin dihalide component of the gaseous reaction mixture is extracted. Residual gaseous reaction mixture may be passed directly to a gas main 16 for fuel purposes, or to waste.

The gaseous reaction mixture may be passed directly to the adsorption bed 15 and then washed, if desired.

When chilled ethylene dichloride is employed in separating end product from the reaction mixture at a point intermediate the reaction zone, this may be accomplished by means of a chilling reservoir 17 feeding spray heads 18, the product being collected in a sump 19 for recycling and/or purification.

The following examples of the process of the invention as applied to specific gaseous mixtures, are illustrative of preferred methods of carrying out the invention.

*Example I*

Coke oven gas similar in composition to the gaseous mixture hereinbefore described was passed through an iron reaction tube at room temperature. The tube approximated six feet in length, and the gas velocity was approximately one foot per second. Chlorine as a gas was passed into the iron reaction tube through a series of nozzles evenly spaced along the length of the chlorinator tube. The total chlorine added for one mole of olefinic compound present in the coke oven gas, in this case primarily ethylene, was about 0.9. The heat of the reaction sufficed to raise the temperature about 100° C. No cooling step was employed. The gaseous mixture leaving the chlorinator contained ethylene dichloride, a small amount of polychlorinated compounds, and a small amount of hydrogen chloride gas, in addition to the unreacted hydrogen, methane, carbon monoxide, carbon dioxide, and nitrogen. This gaseous mixture was treated with a 2% lime slurry in a small packed column to scrub and cool the gases, which were passed through the slurry in a counter-current manner. The scrubbed gases were then passed through an activated carbon bed which adsorbed the ethylene dichloride component as well as the small amounts of polychlor compounds present. The gases leaving this tower contained substantially no chlorinated organic compounds and no chlorine.

Using the alternative direct adsorption procedure described above, the gases from the reactor were passed directly through the carbon bed, and the residual gases were scrubbed with water in a packed column to remove traces of hydrogen chloride and other acidic gases. The gases contained substantially no chlorinated organic compounds and no chlorine.

In either case, the gases leaving this tower were suitable for use as a fuel.

The adsorptive carbon eventually became saturated with ethylene dichloride and contained a small amount of polychlor compounds. By steaming the carbon, the ethylene dichloride and other compounds were driven off and condensed to obtain the organic liquids. The ethylene dichloride was separated from the water layer and distilled to obtain the usual high grade commercial ethylene dichloride.

*Example II*

Tail gases purged from a system for the oxidation of ethylene, containing small amounts of unreacted ethylene, and of a composition previously described, were passed through an iron reaction tube at room temperature and at a velocity of one foot per second, with introduction of chlorine into the stream. A very large conversion of the ethylene component to the dichloride, was obtained. The product was separated and purified in accordance with the procedure set forth in Example I.

Due to the relatively small amounts of hydrocarbons readily taking part in substitution reactions, and hydrogen, in the tail gases, an excess of chlorine or other halogen may be employed in the procedure set forth in Example II, accelerating the reaction rate to form ethylene dichloride. Also, the use of superatmospheric pressures is practicable for this purpose. The details of this specific application of the invention are set forth and claimed in application Serial No. 72,762, filed January 25, 1949.

The procedural requirements hereinabove set forth in connection with the chlorination of ethylene, are equally applicable to the halogenation of ethylene or other olefins, and the invention is not to be limited in this respect, except as defined in the appended claims.

The advantageous procedures of the invention permit of the recovery of halogenated olefins as a valuable byproduct of industrial gases, without impairing the values of the industrial gases for their intended purposes.

The basic process provides for substantially complete halogenation of the available olefins without the use of catalysts and in the absence of expensive procedures for preconditioning the gases prior to reaction. The presence of iron in the reaction chambers achieves the unexpected advantage of catalyzing the rate and extent of reaction, without adding appreciably to the cost of the process or promoting side and substitution reactions.

Due to the small proportions of contaminants present in the gaseous mixture subsequent to reaction, the olefin dihalide constituent may be separated from the reaction stream and condensed with a minimum of expense and time consuming operations, obtaining a product which is readily refined to meet the most rigid commercial standards of purity. The residual gaseous mixture may be used in undisturbed form as a fuel, thereby reducing the overall cost of the process.

The basic process permits of the reaction of olefins and halogens under conditions which would normally be expected to result in the occurrence of undesirable substitution reactions, to a prohibitive degree. By incorporating the suggested auxiliary procedures in the basic process, the commercial value of the process in terms of increased production ratio, with a minimum of contaminants formed, is apparent.

We claim:

1. A process for the manufacture of olefin dichlorides from gaseous mixtures containing from 0.5 to 20 percent by volume of olefin together with inert gas and a volume of other hydrocarbons and hydrogen in excess of the volume of olefin, which process comprises contacting said gaseous mixture with chlorine in a reaction zone at a temperature in the range of $-10°$ to $100°$ C., the amount of chlorine being in the range of from 0.7 to 0.98 mol per mol of olefin, the chlorine being introduced at spaced intervals along the reaction zone with the first introduction containing the major portion thereof, whereby the presence of a stoichiometric excess of chlorine at any point in the reaction zone is avoided, introducing cooled liquid olefin dichloride at spaced intervals along the reaction zone to condense the olefin dichloride formed therein, and withdrawing condensed olefin dichloride at intervals along the reaction zone to maintain the concentration of olefin dichloride in the reaction zone below the saturation point.

2. A process of claim 1, wherein the chlorine is introduced with the cooled liquid olefin dichloride.

3. A process of claim 1, wherein the olefin is ethylene and the temperature in the reaction zone is in the range of from $10°$ to $80°$ C.

4. A process of claim 1, wherein the gaseous mixture is coke oven gas containing a low concentration of ethylene.

5. A process of claim 1, wherein the gaseous mixture is producer gas containing a low concentration of ethylene.

6. A process of claim 1, wherein the gaseous mixture is the tail gas from the oxidation of ethylene containing a low concentration of ethylene.

RALPH LANDAU.
ROBERT B. EGBERT.

References Cited in the file of this patent

UNITED STATES PATENTS

| Number | Name | Date |
| --- | --- | --- |
| 1,456,590 | Eldred | May 29, 1923 |
| 1,509,603 | Mersereau | Sept. 23, 1924 |
| 1,841,279 | Dow | Jan. 12, 1932 |
| 1,851,970 | Askenasy et al. | Apr. 5, 1932 |
| 1,952,122 | Deanesly | Mar. 27, 1934 |
| 2,004,072 | Hass et al. | June 4, 1935 |
| 2,245,776 | Groll et al. | June 17, 1941 |
| 2,403,977 | Heard | Jan. 8, 1944 |

FOREIGN PATENTS

| Number | Country | Date |
| --- | --- | --- |
| 158,836 | Great Britain | 1922 |
| 442,342 | Germany | Mar. 30, 1927 |
| 678,427 | Germany | July 17, 1939 |

OTHER REFERENCES

Dobriansky et al.: "Trans., State Inst. Applied Chem." (U. S. S. R.), vol. 24, pages 21–31 (1935).